United States Patent Office 3,770,717
Patented Nov. 6, 1973

---

3,770,717
AZO DYES FROM CHLOROCARBONYL ARYL DICHLOROTRIAZINES
Asa W. Joyce, Millersville, Md., and Julian J. Leavitt, Plainfield, N.J., assignors to American Cyanamid Company, Stamford, Conn.
No Drawing. Division of application Ser. No. 354,757, Mar. 25, 1964, now Patent No. 3,507,864, which is a continuation of application Ser. No. 125,942, July 24, 1961, now abandoned, which in turn is a division of application Ser. No. 781,871, Dec. 22, 1958, now Patent No. 3,055,895. This application Jan. 9, 1968, Ser. No. 696,497
Int. Cl. C09b 62/08
U.S. Cl. 260—153        4 Claims

---

ABSTRACT OF THE DISCLOSURE

Azo dyes containing a carboxyphenyltriazine nucleus are provided having the formula

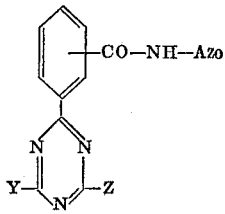

wherein Azo is the remainder of an aminoazo dye and Y and Z are chlorine, bromine, or the residue of an amino-azo dye, an amino-vat dye or an amino-phthalocyanine dye attached to the triazine through its amino group.

---

This is a division of our copending application Ser. No. 354,757 filed Mar. 25, 1964 now U.S. Pat. No. 3,507,864, issued Apr. 21, 1970 which is a continuation of our then copending application Ser. No. 125,942 filed July 24, 1961 now abandoned which, in turn, is a division of our application Ser. No. 781,871, filed Dec. 22, 1958, now U.S. Pat. No. 3,055,895, issued Sept. 25, 1962.

This invention relates to new dyes of the formula

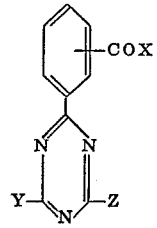

wherein, in the benzoylene moiety, the remaining carbons are bonded to substituents selected from hydrogen, lower alkyl, lower alkoxy, chlorine, and bromine; Y is selected from chlorine, bromine, and —NHR; Z is selected from chlorine, bromine, and —NHR'; X is selected from chlorine, bromine, dialkylamino, diethanolamino, N-piperdyl, N-morpholinyl, and —NHR''; wherein R, R', and R'' are each the remainder of an organic dye containing amino groups, such as an amino-azo dye, an amino-vat dye, or an amino-phthalocyanine dye, the —NH— moiety attached thereto being the residue of an amino group of such dye; with at least one of X, Y, and Z being —NH-azo.

A most important feature of the present invention is the linkage of the dye-residues of amino dyes to a novel carboxyphenyltriazine nucleus to produce a novel class of dyes. These novel dyes may be further characterized as ones wherein a benzoylene moiety is linked to a triazine nucleus with at least one dye residue linked to the carbonyl group of the benzoylene moiety or to a triazine carbon.

Dyes containing the triazine nucleus have been known in the past in several fields of dyestuff chemistry. They have, in the past, had in common the characteristic of a direct linkage through an amino group between the dyestuff residue and the triazine ring. They have usually been formed by the reaction of cyanuric chloride with a dyestuff containing an amino group which has a replaceable hydrogen. Such a reaction is sometimes difficult to carry out and does not always go in a clean-cut manner. This is especially true when the triazine dyestuff is constructed with more than one dye residue on the triazine, especially when several dyestuffs are used.

We have found that compounds of the formula

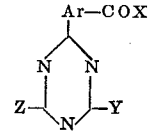

in which Ar is a residue of the benzene series carrying as additional substituents alkyl, alkoxy or halogen groups, and in which X, Y and Z are hydroxy or halogen, such as chlorine and bromine, are intermediates for the formation of new dyestuffs which are exceptional in the ease with which they form such dyestuffs and in the variety of dyestuffs and shades which they may be obtained therefrom. We have further found that the dyestuffs of the similar formula in which at least one of X, Y and Z is the residue of dyestuff linked to the molecule through a replacement of a hydrogen on an amino group are valuable dyestuffs of the vat, azo, direct dye and similar fields. Such dyes could have X, Y and Z represent entirely different dyestuff residues and thus produce composite colors or they can all be the same. Also the intermediate compounds, in which only one or two of X, Y and Z are replaced with a dyestuff residue, are similarly valuable dyestuffs in their own right.

It is an advantage of our invention that these intermediates react more readily with the amino dyestuffs to link a triazine moiety and a dyestuff nucleus into a common molecule. This is of course most especially true of the replacement of X in the above formula since a carbonyl halide reacts more readily than does a triazine halogen. This difference in reactivity further permits the preparation, in a much more clean-cut fashion and with greater ease, of the types of dyestuffs in which there are several different dyestuffs linked to the same triazine molecule and this is a still further advantage of our invention.

It is a further advantage of our invention that the dyestuffs in which X is a color moiety and Y and Z are halogen are stable enough to permit the use of such dyes in high temperature dyeing procedures, a use not normally possible with dichlorotriazinyl dyes. Another advantage of our invention is that other dyes can be prepared (e.g. those in which X is halogen and either or both of Y and Z are dyestuff residues) which have more reactive halogens than normally can be obtained with chlorotriazinylamino dyestuffs. Our invention thus presents an extraordinary flexibility in the dyestuff properties obtainable.

(I) INTERMEDIATES

The new intermediates of our invention are prepared from toluguanamides by oxidation with a permanganate to the corresponding carboxybenzoguanamides. These are then subsequently chlorinated to the acid chloride of the carboxyphenyldichlorotriazine. The known starting materials are easily obtained by beginning with an ortho-, meta-, or a para-, toluic acid chloride and reacting it with dicyandiamide. The resulting toluyldicyandiamide is then hydrolyzed to the biuret with acid, and ring-closed to the toluguanamide by sodium hydroxide in known manner. The preparation of these intermediates is illustrated in more detail by the following series of reactions.

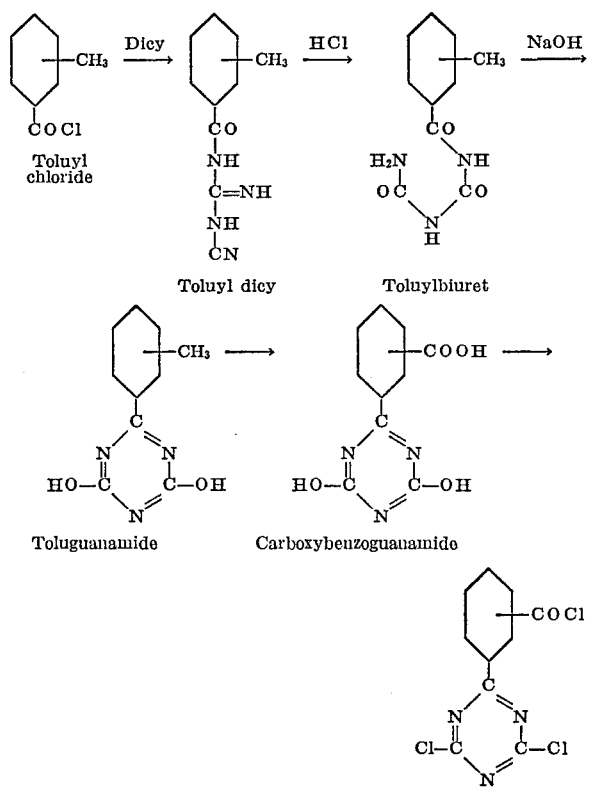

The starting toluic acid chloride may have other substituents present, such as alkyl, alkoxy or halogen. Examples of the toluic acids which may be used are ortho-, meta-, and para-toluic acid, 2-methoxy-5-methylbenzoic acid, 2-chloro-5-methylbenzoic acid, 2-methoxy-4-methylbenzoic acid, 2-chloro-4-methylbenzoic acid, and the like.

In the above equation there is shown the conversion of the benzoguanamide to the corresponding dichlorotriazine derivative. However it is clearly equivalent to use the corresponding phosphorous pentabromide or thionyl bromide in order to form the corresponding bromo compounds and these bromo compounds are included within the scope of our invention.

The groups X, Y and Z in the intermediates of our invention need not all be the same although the species in which they are all alike are the more readily obtainable. However, for example, species in which only X has become chloro or bromo while Y and Z remain hydroxyl can be obtained readily by careful treatment with thionyl chloride under conditions (lower temperature and restricted mole usage of $SOCl_2$) which do not go on to replace the triazine hydroxyls. Similarly the compound in which X, Y and Z are all chloro or bromo can be hydrolyzed step wise to make X alone or X and Y hydroxyl, leaving the others chloro or bromo. This interconversion is illustrated in the following schematic equations:

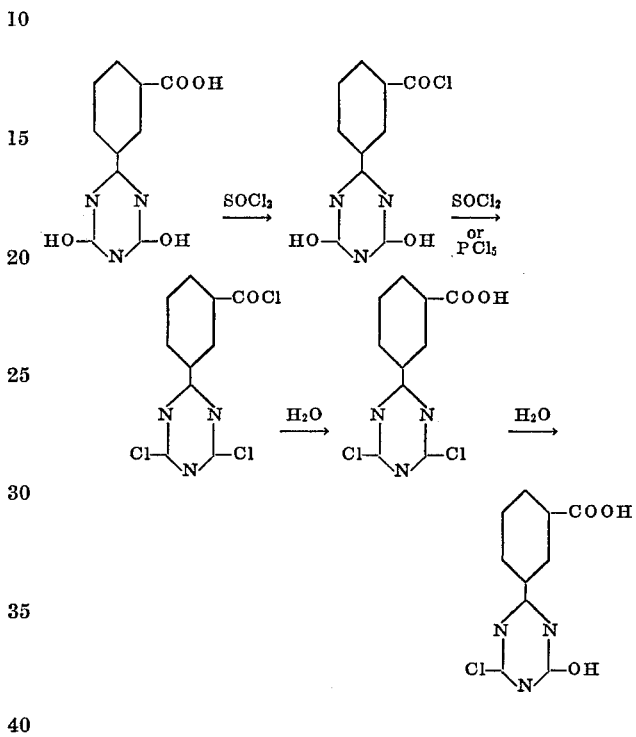

The various intermediate steps shown can, of course, also be used as dye intermediates by the reaction with a dye amine followed by further reaction to form the halogen derivatives. Thus these intermediates of our invention are quite versatile in the preparation of various dyestuffs of the carboxyphenyltriazine type shown in later paragraphs in this specification. Although the above equation shows the m-carboxyphenyl derivative, the reactions occur also with the para and ortho-isomers, as well as with compounds having other substituents on the molecule.

(II) DYESTUFFS

The dyestuffs which can be prepared from the compounds of our invention and which form another aspect of our invention are based on the linking of the carboxyphenyltriazine nucleus to residues of dyestuff amines. The linking is achieved through the amino group in a known dyestuff moiety. This linking can be carried out in a stepwise manner. Thus any of the chlorinated carboxyaryltriazines shown in the above equation can be reacted with an amino dyestuff in which the amino group has a replaceable hydrogen and the said hydrogen is replaced by the carboxyphenyltriazine nucleus to form the bond to the dye residue. The carbonyl chloride radical will react first and thus, in those compounds of our invention in which the carboxyl group has been transformed into the carbonyl chloride, a clean reaction can be obtained to form the dyes in which X is an amino dye residue and Y and Z in the above formulas remain either chlorine, bromine, or hydroxy. Under somewhat differing conditions additional halogens on the triazine can be further replaced, still stepwise to get a complete replacement as well as partial replacement of the halogens. This will be discussed in detail later in the specification, after a discussion of the various amino dyestuffs which can be used.

At least one of the groups X, Y and Z in the generic formula must be, in the dyestuffs of our invention, a residue of an amino dyestuff linked to the phenyltriazine moiety through the amino group. The amino group on the dye residue may be either a primary or secondary amino group in the original dye molecule. It cannot be a tertiary amino group since there would be no replaceable hydrogen by whose elimination there could be formed a further covalent bond with the phenyltriazine moiety. The dye residues which may thus be linked to the phenyltriazine nucleus in the dyestuffs of our invention will be described below in much detail. In that discussion, extensive reference will be made to The Chemistry of Synthetic Dyes by K. Venkataraman, Academic Press, New York (1952) and to the American Chemical Society, Monograph No. 127, on the Chemistry of Synthetic Dyes and Pigments by H. H. Lubs, Reinhold, New York (1955). While many of the dyestuff residues which may be used in the dyes of our invention will be described in detail in the specification, in order to provide a complete disclosure these treatises are included expressly by reference in this specification as indicated in the various discussions.

The principal limitations on the dyestuff residues which may be used in forming the dyes of our invention is that these dyestuff residues must contain an amino group capable of forming a further covalent linkage, i.e., and amino group having a replaceable hydrogen. Such a definition includes primary and secondary amino groups and excludes tertiary amino groups. In general, a secondary amine is preferably an alkyl aryl amino compound, since the diaryl amines do not react as well. As described below, all the various classes of dyestuffs can be used, but those members which are useable have this factor in common: —no matter what the general class of dyestuff involved, the dyestuff residue must have a primary or secondary amino group which can react with the halogens in the carboxyphenyltriazine nucleus to form the dyestuffs of our invention. In general dyestuffs of similar structure are preferred.

When water-soluble dyestuffs are desired, the dyestuff residue should contain an acidic group in order to achieve the proper water solubility. Of the acidic groups, the sulfonate group is of course by far the preferred one with the carboxylate and sulfonamide groups the ones most likely to be used next.

(A) The dyestuff residues—azo dyes

Azo dyes are described in Venkataraman in chapters 11–22, inclusive, pages 409–704, and in Lubs, chapter 3, pages 96–181. A great many azo dyestuffs are known to the art which have primary or secondary amino groups in their structure. Such compounds, as described in the above-mentioned pages of Venkataraman and Lubs, are expressly included by reference as useable in the formation of the dyestuffs of our invention.

The azo dyes represent probably the largest class of dyestuffs and the class giving the greatest flexibility in structure and color. There can be used in the dyestuffs of our invention all the variations of azo dyes known, such as the monoazo dyes, the disazo, the trisazo, the tetrakisazo, the mordant dyes, the stilbene dyes, the pyrazolone and thiazole dyes, and the like, so long as the restrictions are met of a primary or a secondary amino group through which they can be attached to the triazine ring.

To illustrate the type of dye used in our invention a simple example is as follows, wherein an azo dye derived from 2-amino-5-chloro-4-toluenesulfonic acid coupled to H-acid (8-amino-1-naphthol-3,6-disulfonic acid) is linked through the amino group to the carbonyl group of m-carboxyphenyldichlorotriazine.

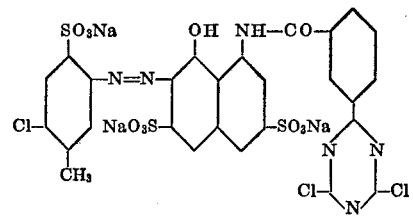

Such a dyestuff is prepared by reacting one mole of the aminoazo dye with the dichlorotriazinylbenzoyl chloride. If three moles of the aminoazo dye are used, all three chlorines are replaced.

The azo dye itself may be used for the reaction with the carboxyphenyltriazine derivative. However, in the case of azo dyes especially, there are alternative methods whereby the chlorocarbonylphenyldichlorotriazine may be first reacted with an amino aromatic compound, to be used as a coupling component or as a diazo component in forming the azo molecule. In the reaction, for example, of one mole of an aminonaphthol with dichlorotriazinylbenzoyl chloride followed by coupling of a diazo component into the naphthol, there is obtained the same dyestuff which would be obtained by first coupling into the free aminonaphthol and then condensing the azo dyestuff with the triazine compound. Similarly, the halogenated triazine compound may be reacted with one amino group in an aromatic diamine and the other amino group can be diazotized and coupled to form the azo derivative. These synthetic methods can be illustrated by the following equations. In the first, chlorotoluidinesulfonic acid is diazotized and coupled with H-acid to form the azo dye and this is then condensed with M-(dichlorotriazinyl)benzoyl chloride to give the dichlorotriazinylbenzoylamido azo dye.

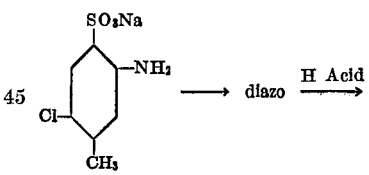

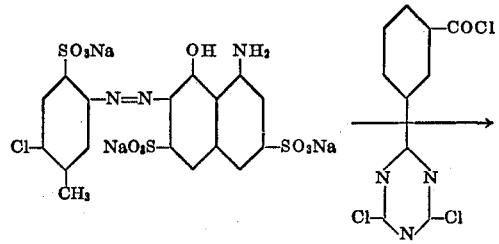

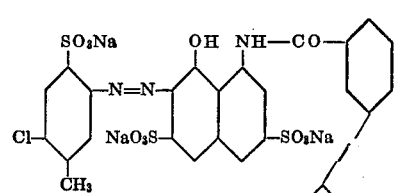

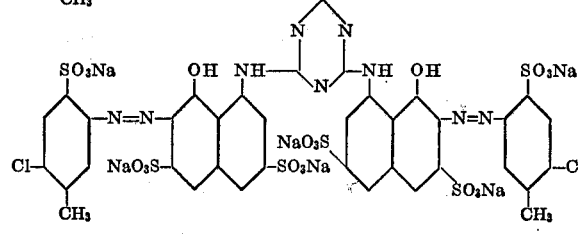

Alternatively, the same dyestuff can be prepared by reacting H-acid with M-(dichlorotriazinyl) benzoyl chloride and coupling the reaction product with chlorotoluidinesulfonic acid (CTS) diazo.

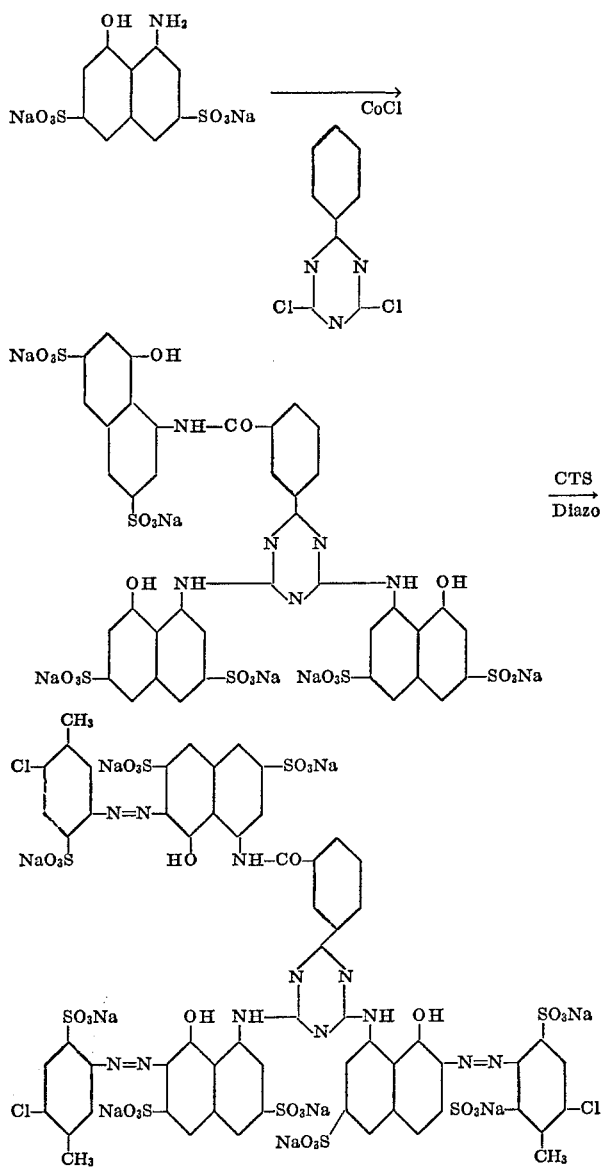

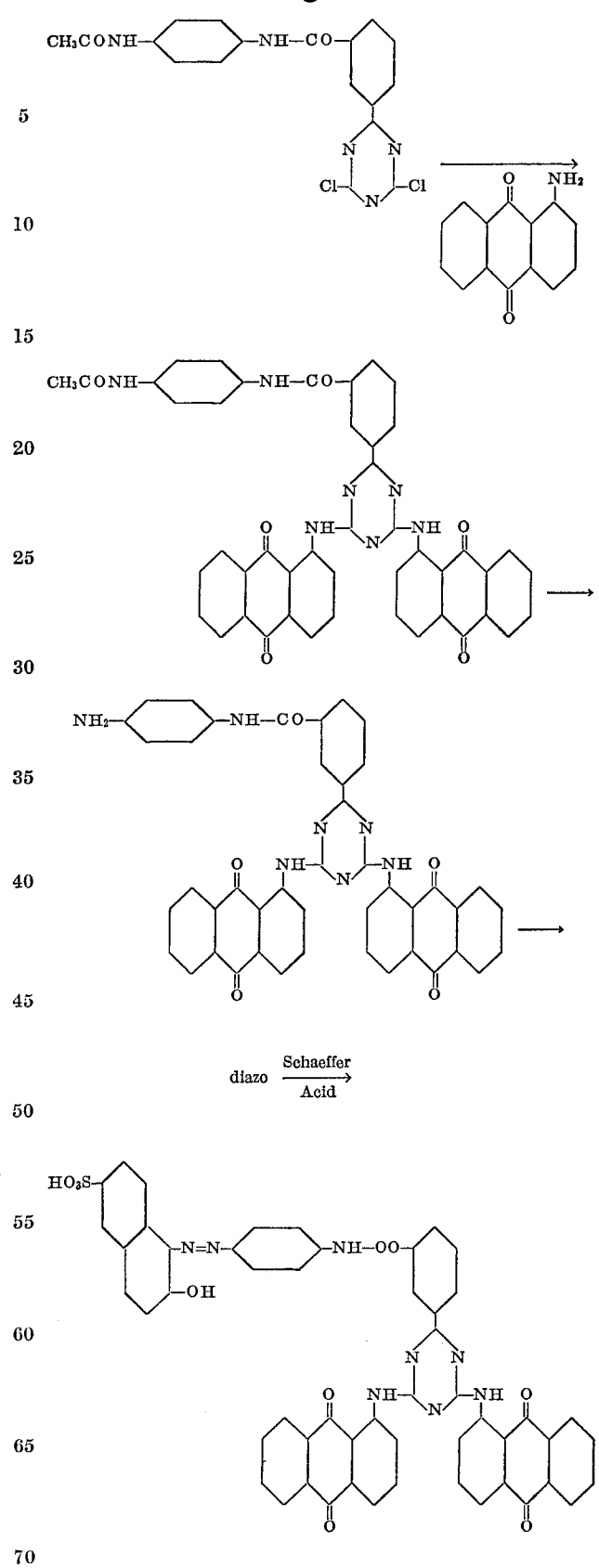

A third alternative way of preparing the dyestuffs used in our invention in which the dyestuff residue attached to the triazine is an azo dye, is illustrated in the following equation in which p-aminoacetanilide is reacted with the dichlorotriazinylbenzoylchloride, the acetyl group is hydrolyzed off, and the liberated amino group is diazotized and coupled into Schaeffer Acid:

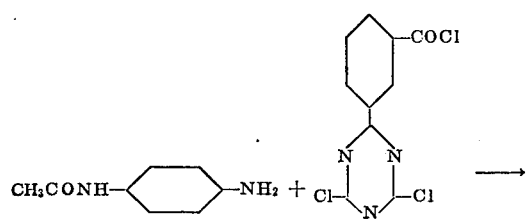

Obviously, if there are further amino groups in the completed dye molecule, or if the dye molecule is capable of furhter coupling disazo, trisazo and tetrakisazo dyestuffs can be readily prepared, either before or after the diaminotriazinyl radical is placed upon an amino group in the dyestuff residue.

The preparation of the azo dyes may be carried out under conventional conditions, whether the azo dye is prepared first and then reacted with the halogenated carboxyphenyltriazine to form the dyes of our invention, or whether the triazine compound is reacted with either the diazo component or the coupling component and the azo dye is then subsequently synthesized. The reaction of the azo dye or its fragments with the various halogenated carboxyphenyltriazines may be carried out under various conditions. For example, either aqueous or non-aqueous conditions can be used. The reaction under aqueous conditions is carried out in the presence of an acid-binding agent, such as sodium carbonate or potassium carbonate to take up the hydrogen chloride evolved. In a non-aqueous system, if the azo dye contains sulfonic groups, an amine salt of the azo dye, which will confer solubility in an organic solvent, is conveniently used. Such an amine salt as the di-o-tolylguanidine salt is quite conveniently used in the reaction with the carboxyphenyltriazine derivatives. Where there is no water solubilizing group in the azo dye, a non-aqueous system is preferred.

The azo dye residues of the new triazine dyes which form our invention are derived from various diazo components and coupling components. Examples of the amines which may be used for the diazo components are:

aniline
o-nitroaniline
m-nitroaniline
p-nitroaniline
o, m, and p-chloroaniline
2-nitro-4-chloroaniline
2-amino-5-nitrotoluene
4-amino-3-nitrotoluene
2-amino-4-nitrotoluene
2-amino-5-chlorotoluene
2-amino-4-chlorotoluene
2-amino-6-chlorotoluene
2,5-dichloroaniline
3,4-dichloroaniline
3-amino-4-chlorotoluene
o-anisidine
3-nitro-4-methoxyaniline
4-nitro-2-methoxyaniline
2-nitro-4-ethoxyaniline
dianisidine
4-amino-2,5-diethoxybenzanilide
4-amino-2,5-dimethoxybenzophenone
benzidine (including the monoacetyl derivative)
tolidine
4-chloro-2-methoxyaniline
2,4-dimethoxy-5-chloroaniline
4-amino-2-methoxy-5-chlorobenzanilide
1-naphthylamine
1-aminoanthraquinone
1-amino-3-chloroanthraquinone
3-amino-4-methoxybenzenesulfonedimethamide
4-methoxy-3-aminophenyl ethyl sulfone
5-benzamido-2,4-xylidine
4-methoxy-4'-aminodiphenylamine
4-aminodiphenylamine
4-chloro-2-aminodiphenyl ether
4,4'-dichloro-2-aminodiphenyl ether
o-aminodiphenylamine
5-methyl-4-methoxy-2-amino-2'-chloro-4'-nitro-azobenzene
4'-aminodiphenylamino-4-azotoluene
2-amino-4-sulfodiphenyl ether
2-amino-2'-methyl-4-sulfodiphenyl ether
4-aminoazobenzene
4-aminoazobenzene-4'-sulfonic acid
4-aminoazobenzene-3,4'-disulfonic acid
orthanilic acid
5-methyl-orthanilic acid
2-amino-5-chloro-4-toluenesulfonic acid
4-chloroaniline-2-sulfonic acid
aniline-2,5-disulfonic acid
4-chloro-5-methyl-2-anilinesulfonic acid
2-amino-4-methoxybenzenesulfonic acid
2,4-dimethylaniline-6-sulfonic acid
2-amino-4-trifluoromethylbenzenesulfonic acid
3,4-dichloroaniline-6-sulfonic acid
3,5-dichloroaniline-6-sulfonic acid
3-methoxyaniline-6-sulfonic acid
4-methylaniline-6-sulfonic acid
dehydrothiotoluidinesulfonic acid
2-aminonaphthalene-4,8-disulfonic acid
2-aminonaphthalene-6-sulfonic acid
2-aminonaphthalene-6,8-disulfonic acid
1-aminonaphthalene-4,5,6 and 8-sulfonic acid
2-aminonaphthalene-5,7-disulfonic acid
2-aminonaphthalene-7-sulfonic acid
p-phenylenediamine
3,3'-dichlorobenzidine
3,3'-benzidinedisulfonic acid
2,2'-dichloro-3,3'-dimethoxy-4,4'-diaminodiphenyl
3-aminopyridine
5-aminoquinoline
4,4'-diaminostilbene-2,2'-disulfonic acid
3,8-diaminodibenzothiophene and its sulfonic acid Examples of the compounds which may be used as the coupling components are:

aniline
o-toluidine
m-toluidine
2,5-dimethylaniline
o-anisidine
m-anisidine
2-methoxy-5-methylaniline
2,5-dimethoxyaniline
N-methylaniline
N-methyl-o-toluidine
N-methyl-m-toluidine
N-ethyl-o-toluidine
N-methyl-2-methoxy-5-methylaniline
N-ethyl-2-methoxy-5-methylaniline
N-methyl-m-anisidine
N-ethyl-m-anisidine
1-amino-8-naphthol-6-sulfonic acid
1-amino-8-naphthol-3,6-disulfonic acid
1-amino-8-naphthol-4,6-disulfonic acid
1-methylamino-8-naphthol-6-sulfonic acid
2-amino-5-naphthol-7-sulfonic acid
2-methylamino-5-naphthol-7-sulfonic acid
1-amino-8-naphthol-2,4-disulfonic acid
1-amino-8-naphthol-4-sulfonic acid
3-methyl-5-pyrazolone
1-phenyl-3-methyl-5-pyrazolone
1-(4-sulfophenyl)-3-methyl-5-pyrazolone
1-(4-chlorophenyl)-3-methyl-5-pyrazolone
1-phenyl-3-carbethoxy-5-pyrazolone
acetoacetanilide
4-sulfoacetoacetanilide
bis-acetoacetbenzidide
bis-acetoacettolidide
acetoacettolidide
beta-hydroxynaphthoic acid
arylides of various hydroxy naphthoic acids such as 3-hydroxy-2-naphthanilide
3-hydroxy-2-naphthoyltoluidide
and the like.

Many other coupling components and diazo components are described in the various chapters of Venkataraman covering the azo dyes, found on pages 409–704 of that treatise. Any combination of these components which produces an azo dye having an amino group capable of reacting with the halogenated carboxyphenyltriazine derivative (i.e., a primary or secondary amino group) is capable of forming the dyestuffs of our invention which contain azo dye residues. A great many such dyes are specifically disclosed in these chapters. As stated above, the amino group may be either a primary or a secondary, but not a tertiary amino group. There must be one hydrogen capable of replacement by the carboxyphenyltriazine radical.

(B) Vat dye residues

The various anthraquinone and other polyquinonoid structures which are known collectively under the generic term of "vat dyes," are described in Venkataraman in chapters 27–34, inclusive, pages 803–1058. To the extent that anthraquinones and other vat dye structures are available having a primary or a secondary amino substituents, they are readily useable in the dyestuffs of our invention in the same way as the azo dyestuff residues.

Examples of some of the anthraquinonoid compounds which may be used to form the dyestuff of our invention are:

1-aminoanthraquinone
2-aminoanthraquinone
2-methyl-1-aminoanthraquinone
2-amino-3-chloroanthraquinone
4-methyl-1-aminoanthraquinone
6-methyl-1-aminoanthraquinone
3-chloro-1-aminoanthraquinone
5-chloro-1-aminoanthraquinone
5-benzamido-1-aminoanthraquinone
4- and 5-aminoanthraquinone-1(N)2-benzacridones
4- and 5-aminoanthraquinone-1(S)2-thioxanthrones
4-aminoanthrapyrimidine
4-amino-2,3-benzanthraquinone
1,9-pyrazolanthrone
aminodibenzanthrone
4-aminoanthraquinone-1(N),2,1'(N)2'-carbazole
1,4-diamino-2-(2,3-anthraquinonethiazolyl)anthraquinone
1,9-thiazoloanthrone
1-chloro-2-aminoanthraquinone
2-amino-3-methylsulfonylanthraquinone
2-amino-6-benzamidoanthraquinone
1-amino-4-(4'-aminophenylamino)-anthraquinone-2,3'-disulfonic acid
1-methylamino-4-(4'-aminophenylamino)-anthraquinone-2,3'-disulfonic acid
1-amino-4-(4'-aminophenylamino)-anthraquinone-disulfonic acid
1-amino-4-(4'-aminophenylamino)-anthraquinone-2,3',5'-trisulfonic acid
1-amino-4-(4'[4"-aminophenylazo]-anilino)-anthraquinone-2,5,2"-trisulfonic acid
1-amino-4-(4'[4"-aminophenyl]-anilino)-anthraquinone-2,5,3"-trisulfonic acid
1-amino-4-(4'-aminophenylamino)-anthraquinone-3'-sulfonic acid
1-amino-4-(3'-aminophenylamino)-anthraquinone-4'-sulfonic acid
1-amino-4-(4'-aminophenylamino)-anthraquinone-2-sulfonic acid
1-amino-4-(3'-amino-4'-methylphenylamino)-anthraquinone-2-sulfonic acid
1-amino-4-(4'-amino-3'-methylphenylamino)-anthraquinone-2-sulfonic acid
1-amino-4-(3'-amino-4',6'-dimethylphenylamino)-anthraquinone-2-sulfonic acid
1-amino-4-(4'-aminophenylamino)-anthraquinone-3'-sulfonic acid diethylamide In addition to this list there is a class of anthraquinonoid compounds which may be represented by the formula:

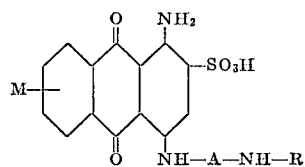

in which M is hydrogen or sulfonic acid and A represents an arylene radical which may be further substituted with acidic groups such as sulfonic acid or carboxylic acid and where R is hydrogen, alkyl, aralkyl or cycloalkyl. The aromatic diamine portion of this molecule —NHANHR— may be derived from various aromatic diamines such as:

m-phenylene diamine
p-phenylene diamine
benzidine
dichlorobenzidines
4,4'-diaminoazobenzene
m-phenylenediamine-4-sulfonic acid
benzidine-3-sulfonic acid
p-phenylenediamine-2-sulfonic acid
4,4'-diaminoazobenzene-2-sulfonic acid
p-phenylenediamine-2-carboxylic acid and the like.

Of especial interest along this line are the acid anthraquinone dyes described in chapter 29 of Venkataraman, pages 834–860, wherein a large number of compounds having solubilizing groups are described.

Vat dye residues without solubilizing groups may be selected from any of the amino-substituted vat dyes or vat dye intermediates shown in pages 803–1058 of Venkataraman. When vat dyes are desired, at least two vat dye residues must be linked to the carboxyphenyltriazine nucleus.

(C) Phthalocyanine residues

The phthalocyanine structure is known to be a highly stable and highly colored chemical structure. Its use in pigments is well known and is described in Venkataraman, chapter 38, pages 1118–1142. Various amino substituted phthalocyanines are known including many which are sulfonated or carboxylated or otherwise substituted by an acid grouping. Such compounds with or without solubilizing groups are readily usable in preparing the dyes of our invention. The amino groups may be directly on the phthalocyanine rings or they may be in a side-chain such as an aminomethyl group. The latter is preferred because of the ease of preparation, since such products can be prepared from the phthalocyanine itself by treatment with methylolphthalimide and sulfuric acid as described in the U.S. Letters Patent 2,761,868 to Lacey. Sulfonation can occur at the same time under the proper conditions and up to four aminomethyl groups can readily be introduced as well as up to four sulfonic acid groups. Also phthalocyanine carboxylic acids can be aminomethylated in the same manner. Similarly, the nuclear substituted phthalocyanines such as those containing one to four chlorines can be sulfonated and/or aminomethylated. The total number of substituents should not exceed nine in one phthalocyanine molecule. The phthalocyanine or in the form of copper, cobalt, nickel or other metal complexes in which form they are also used in our invention. When phthalocyanines without solubilizing groups are used, the products are pigments only, unless a second dye of another class is also combined with the triazine derivatives.

(D) Other dyestuff classes

The other classes of dyestuffs which are known are generally of less importance than the three classes described above. However, they may have the necessary combination of an acid grouping and a primary or a secondary amino group, and when they do they can be used in the preparation of dyestuffs of our invention. Compounds having the necessary prerequisites can be found among the xanthene, acridine and azine dyestuffs, e.g., described on pages 740–795 of Venkataraman.

A complete line of the dyes of our invention will necessarily include azo structures, vat structures, and phthalocyanines, at least, in order to get the minimum variety needed of colors and properties.

(III) PREPARATION OF DYESTUFFS

The dyestuffs of our invention are prepared by the ordinary acylation procedures by which carboxylic chlorides are reacted with amines and triazinyl chlorides are reacted with amines. These procedures will vary generally, depending on the amines used and consequently, the procedure modifications used will depend upon what amino dyestuff residue is being introduced into the molecule.

In general, the carbonyl chloride group on the phenyl portion of the molecule will react with an amine first. When only one mole of an amino dyestuff is used this is the chlorine which is replaced and the resulting product is a dichlorotriazinylbenzamide. With the use of larger quantities of dyestuff amine and of more drastic temperatures as described above, the triazine chlorines are readily replaced. Thus, if a second different amine is used a mixed dye is obtained. This can be done stepwise, so that dyestuffs having one, two or three amino dyestuff residues can be prepared, the amino dyestuff residues being the same or different.

In the preparation of the dyestuffs of our invention, as an alternative, the carboxyl chloride substituents can be reacted with amines other than dyestuff amines, provided the chlorines on the triazine ring are replaced by at least one amino dyestuff moiety. Such other amines include dialkylamines such as dimethylamine, diethylamine, dipropylamine and the like, piperidine and morpholine. However, when the triazine chlorines or bromines are then replaced, they must be replaced by amino dyestuff residues. If the triazine chlorines remain on the molecule, in order to have a dyestuff the carbonyl chloride substituent must have been reacted with an amino dyestuff.

Any of the intermediates described in preceding portions of this specification can be used to give dyestuffs by replacing the halogens present. Any hydroxyl then remaining can be converted into halogen and used for further replacement by amino dyestuff if such is desired. That is, the use successively of several different dyestuffs permits the obtaining of a wide variety of shades. One may have mixtures of different amino vat dyes, different azo dyes, or different aminophthalocyanines. One can also have mixtures of amino vat dyes, amino azo dyes or of three different kinds of dyestuffs. In general, when one has at least two azo groupings, one applies the compounds like an azo dyestuff. Similarly, if one has at least two amino vat dye structures linked to the phenyltriazine nucleus, one uses the product as a vat dye. If the amino dyestuff substituents in the dyestuffs of our invention have at least two solubilizing groups, the product can be applied as an acid dye. If they have no solubilizing groups, the product may be used as a pigment unless it can be applied as a vat dye. The dyestuffs which have chlorines remaining in the molecule may also be applied by techniques involving the reaction of these chlorines with fibers. The various types of dyestuffs which form our invention and their modes of application can be illustrated by the following table in which X, Y and Z refer to the general formula

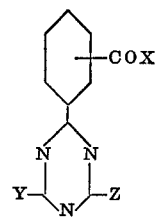

| X | Y | Z | Used in the usual manner for— |
|---|---|---|---|
| Aminoazo dye (sulfonated) | Aminoazo dye (sulfonated) | Aminoazo dye (sulfonated) | Acid dye. |
| Do | Aminoazo dye | Aminoazo dye | Pigment (possibly acid dye if sufficiently soluble. |
| Aminoazo dye | do | do | Pigment. |
| Amino vat dye | Amino vat dye | Amino vat dye | Vat dye or pigment. |
| Do | do | Aminoazo dye | Do. |
| Amino vat dye (sulfonated) | Amino vat dye (sulfonated) | Aminoazo dye (sulfonated) | Acid dye or vat dye. |
| Aminophthalocyanine | Amino vat dye | Amino vat dye | Vat dye or pigment. |
| Do | Aminophthalocyanine | Aminoazo dye | Pigment. |
| Aminophthalocyanine (sulfonated) | Aminophthalocyanine (sulfonated) | Aminophthalocyanine (sulfonated) | Acid dye. |
| Amino-coupling component | Amino coupling component | Amino coupling component | Azoic dye with diazo developer. |
| Amino-diazo component | Amino diazo component | Amino diazo component | Diazo developer with naphthol. |
| Amine | Amino vat dye | Amino vat dye | Vat dye. |
| Aminoazo dye (sulfonated) | Aminoazo dye (sulfonated) | Chlorine | Acid dye or dye reacting with fiber. |
| Do | Chlorine | do | Do. |
| Chlorine | Amino vat dye | do | Dye reacting with fiber. |
| Do | Aminoazo dye (sulfonated) | Aminoazo dye (sulfonated) | Acid dye or dye reacting with fiber. |

Other variations in the possible combinations will be obvious to the dye chemist.

Our invention can be illustrated by the following examples in which parts are by weight unless otherwise specified and parts by volume are to parts by weight as milliliters are to grams.

EXAMPLE 1

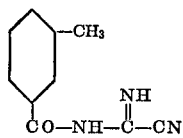

A mixture of 67.5 parts of dycyandiamide, 560 parts of acetone and 5 parts of water is cooled to 0° C. 64 parts of potassium hydroxide is added and, while stirring at 0 to 5° C., there is added dropwise, gradually a solution of meta-toluyl chloride prepared by chlorination of 49.7 parts of m-toluic acid in 80 parts of acetone. After stirring for 2 hours, the temperature is allowed to rise gradually to 10° C. The mixture is then drowned in 2500 parts of water, containing 50 parts sulfuric acid. The solid precipitate is removed by filtration and washed acid-free.

The corresponding p-toluyl derivative is obtained by starting with p-toluic acid. The corresponding 2-methoxy-5-methyl-benzoyl derivative is obtained by starting with 2-methoxy-5-methyl-benzoyl chloride.

EXAMPLE 2

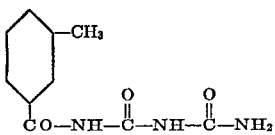

The meta-toluyl dicyandiamide prepared as described in Example 1 is added to 500 parts of water and 120 parts of 5 N hydrochloric acid. The mixture is heated at the reflux temperature for four hours and, after cooling, the solid product is removed by filtration, washed and dried, giving the m-toluyl biuret.

p-Toluylbiuret is obtained in similar fashion by hydrolysis of p-toluyldicyandiamide, as is also 2-methoxy-5-methylbenzoylbiuret.

EXAMPLE 3

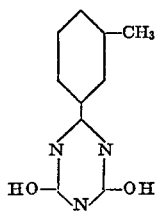

To a solution of 60 parts of potassium hydroxide in 1100 parts of water is added 42.7 parts of m-toluylbiuret prepared as described in Example 2. After stirring and heating to 50° C., the mixture is allowed to stand overnight. It is then heated to 50° C. with 5 parts of decolorizing charcoal. After filtration, the filtrate is acidified with concentrated hydrochloric acid, cooled and stirred. The product is removed by filtration, washed and dried, giving the m-toluguanamide, melting point 274–276° C.

The p-toluyl guanamide is obtained in similar manner starting with p-toluylbiuret, and similarly 2-methoxy-5-methylbenzoguanamide is obtained from 2-methoxy-5-methylbenzoyl biuret.

EXAMPLE 4

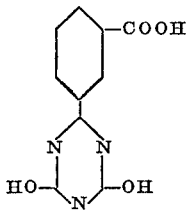

To a solution of 21.8 parts of potassium hydroxide and 1500 parts of water at 50° C. is added 35.7 parts of m-toluguanamide (2-m-tolyl-4,6-dihydroxy-s-triazine). After stirring and increasing the temperature to 60° C., complete solution is obtained. To the solution is then added 55.5 parts of potassium permanganate in small proportions over a period of many hours, a fresh portion of permanganate being added only when a test spot on paper shows no permanganate color. The slurry is then filtered to remove manganese dioxide. The filter cake is washed with hot water and any color in the filtrate is discharged by the addition of a small amount of sodium bisulfite. The clear colorless filtrate is then acidified at 30 to 40° C. with about 60 parts of concentrated hydrochloric acid and the white crystalline precipitate is removed by filtration, washed with water and dried.

The following products are prepared using a procedure similar to that described above but using an appropriately substituted methyl-benzoguanamide:

o-Carboxybenzoguanamide
m-Carboxybenzoguanamide
p-Carboxybenzoguanamide
2-methoxy-5-carboxybenzoguanamide

EXAMPLE 5

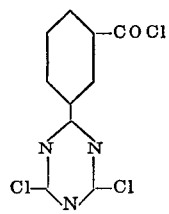

To 55 parts of chlorobenzene is added 9.4 parts of meta-carboxybenzoguanamide. With stirring is then added 25 parts of phosphorous pentachloride and 0.2 part of triethylamine sulfur trioxide complex. The mixture is heated with stirring at the reflux temperature until the reaction is substantially complete. After several hours at the reflux temperature, about 0.5 part of phosphorus oxychloride triethylamine complex is added. A small amount of solid material is removed by filtration. The chloro-benzene is removed from the filtrate by vacuum distillation, giving the crude product which is purified by recrystallization from methyl cyclohexane.

The following acid chlorides of 2-carboxyphenyl-4,6-dichlorotriazines are prepared using a similar procedure:

o-Carboxy
p-Carboxy
2-methoxy-5-carboxy

By using equivalent amounts of phosphorous pentabromide and phosphorus oxybromide, the corresponding bromo derivatives are obtained.

EXAMPLE 6

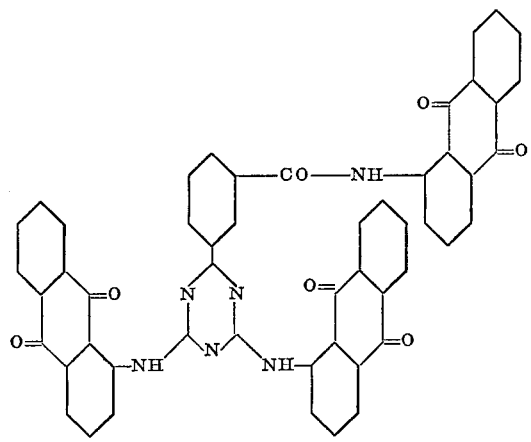

To 82 parts of nitrobenzene is added 2.9 parts of the acid chloride of 2-(m-carboxyphenyl)-4,6-dichloro-s-triazine and 6.7 parts of 1-aminoanthraquinone. The mixture is heated with stirring. A reaction starts at about 60° C. with evolution of hydrochloric acid. The heating is continued and at about 130° C., a second reaction starts and the slurry thickens. An additional 55 parts of nitrobenzene is added. The heating with stirring is continued at 140° C. to 150° C. until the reaction is substantially complete. The mixture is cooled. Two parts of sodium carbonate is added and the mixture is warmed to 60° C. The solid product is then removed by filtration, washed and dried. The product dyes cotton a yellow shade from a claret vat.

EXAMPLE 7

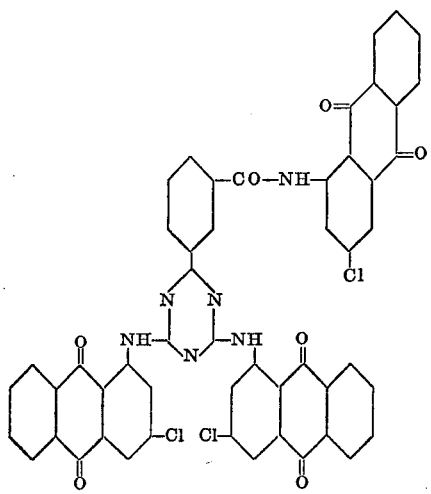

The procedure of Example 6 is followed, using an equivalent quantity of 1-amino-3-chloro-anthraquinone in place of the 1-aminoanthraquinone, to give a dye which dyes cotton a bright yellow shade from a brown vat.

EXAMPLE 8

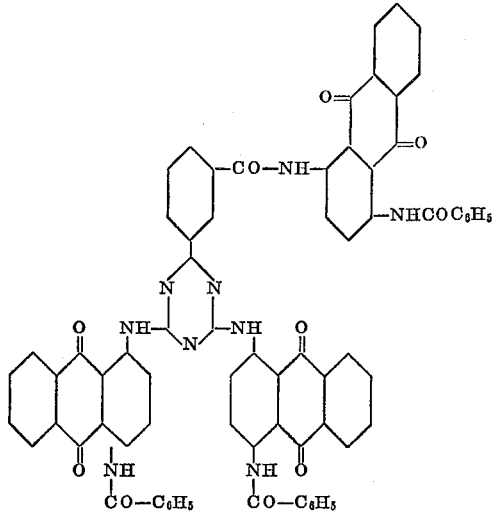

The procedure of Example 6 is followed, using an equivalent quantity of 1-amino-4-benzamido-anthraquinone in place of the 1-aminoanthraquinone, to give the above product which dyes cotton a red of excellent fastness.

EXAMPLE 9

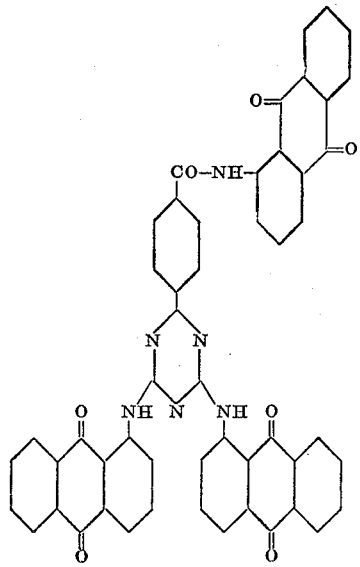

The procedure of Example 6 is followed using an equivalent amount of the acid chlorine of 2-(p-carboxyphenyl) - 4,6 - dichloro-s-triazine in place of the acid chloride of 2 - (m - carboxyphenyl) - 4,6 - dichloro-s-triazine, to give the above yellow dyestuff.

EXAMPLE 10

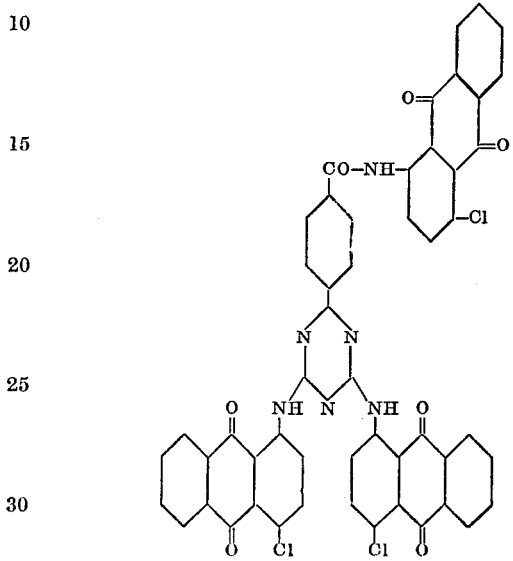

The procedure of Example 6 is followed, using the acid chloride of the paracarboxy compound in place of the m-carboxy compound, and using 1-amino-4-chloro-anthraquinone in place of the 1-aminoanthraquinone, to give the above product which dyes cotton a reddish shade of yellow.

EXAMPLE 11

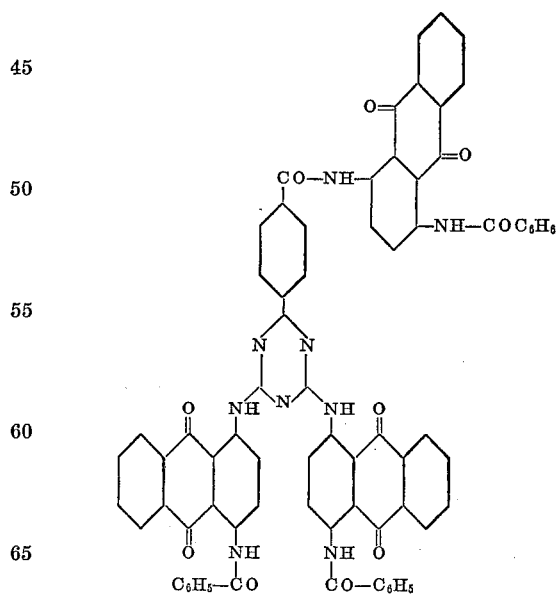

The procedure of Example 6 is followed, using the acid chloride of the p-carboxy compound in place of the m-carboxy compound, and using 1-amino-4-benzamidoanthraquinone in place of 1-aminoanthraquinone. The product dyes cotton a red color.

EXAMPLE 12

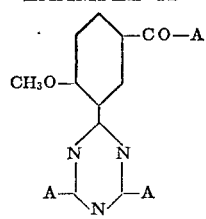

(Where A is an α-aminoanthraquinone residue linked through the the amino nitrogen.)

The procedure of Example 6 is followed, using the acid chloride of 2-(2-methoxy-5-carboxyphenyl)-4,6-dichloro-s-triazine in place of the acid chloride of 2-(m-carboxyphenyl) - 4,6 - dichloro - s - triazine, and using the various aminoanthraquinones shown below.

| Amine: | Dye color |
|---|---|
| 1-aminoanthraquinone | Yellow. |
| 1-amino-4-benzamidoanthraquinone | Red. |
| 1-amino - 4 - (3-methylsulfonylbenzamido)- anthraquinone | Red. |
| 1 - amino - 4 - (m - methoxybenzamido)- anthraquinone | Red. |

EXAMPLE 13

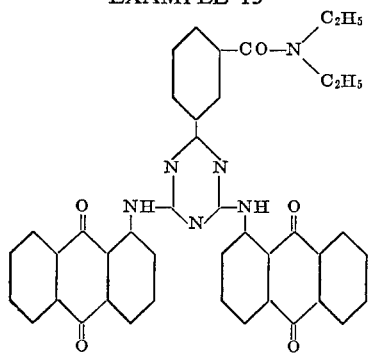

To 2.9 parts of the acid chloride of 2-(m-carboxyphenyl)-4,6-dichloro-s-triazine in 70 parts of nitrobenzene is added gradually 0.75 part of diethylamine in 10 parts nitrobenzene. Then one part of triethylamine is added and the mixture is stirred and wramed gradually to 50° C. To the mixture at this temperature is then added 4.4 parts of 1-aminoanthraquinone. The whole is then heated gradually with stirring to a temperature of 135° C. and is then held at this temperature until the reaction is substantially complete. Two parts of triethylamine is then added and the solid is removed by filtration. The product dyes cotton yellow.

Similar products are obtained when equivalent amounts of dipropylamine, dioctylamine, morpholine, or piperidine are substituted for the diethylamine.

EXAMPLE 14

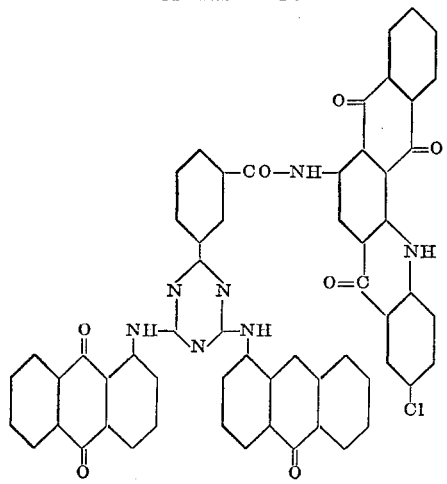

A mixture of 3.8 parts of 2-amino-7-chloro-3,4-phthaloylacridone in 110 parts of nitrobenzene is stirred at 185–190° C. until solution is achieved. It is then cooled to 40° C. and 2.9 parts of the acid chloride of 2-(m-carboxyphenyl)-4,6-dichloro-s-triazine is added. The mixture is heated gradually to 100° C. and is then stirred at 100–110° C. until the reaction is substantially complete.

Then 4.5 parts of 1-aminoanthraquinone and 40 parts nitrobenzene are added and the whole is heated at 145–150° C. with stirring until the further reaction is substantially complete. The solid product is removed by filtration at 60° C., washed and dried. The product dyes cotton a blue-grey color.

EXAMPLE 15

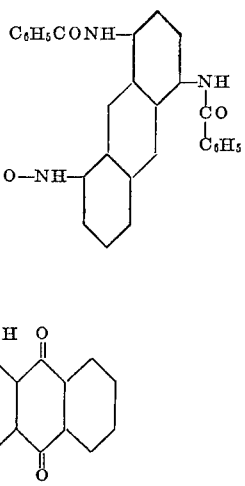

To 4.7 parts of 5,8-dibenzamido-1-aminoanthraquinone slurried in 110 parts of nitrobenzene is added 2.9 parts of the acid chloride of 2-(m-carboxyphenyl)-4,6-dichloro-s-triazine. The mixture is very gradually heated to 120° C. Then 5.1 parts of 1-amino-4-methoxyanthraquinone and 2 parts of dimethyl cyanamide are added and the mixture is stirred at 125–130° C. until the reaction is substantially complete. The solid is removed by filtration, washed and dried. It dyes cotton a red color.

EXAMPLE 16

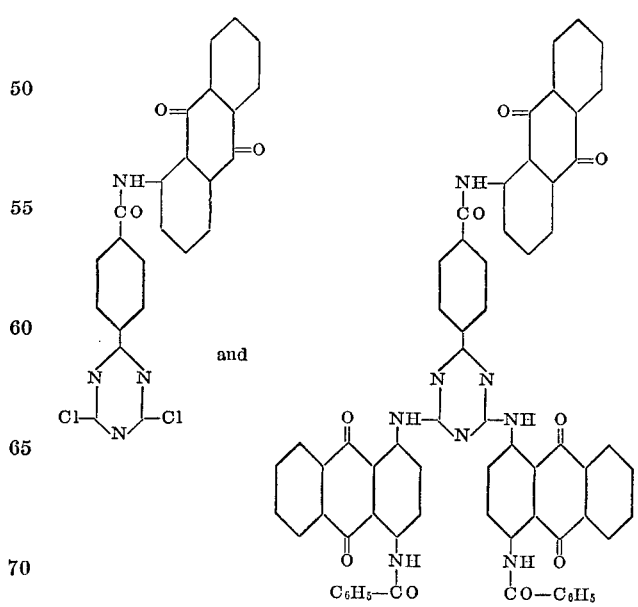

To a slurry of 2.25 parts of 1-aminoanthraquinone and 110 parts of nitrobenzene at 30° C. is added 2.9 parts of the acid chloride of 2-(p-carboxyphenyl)-4,5-dichloro-s- triazine. The mixture is heated to 47–48° C. gradually and it is then stirred at 48–55° C. until the reaction is substantially complete. The solid dichlorotriazine compound is removed by filtration, washed and dried.

A mixture of 3.3 parts of the yellow dichlorotriazine compound and 4.8 parts of 1-amino-4-benzamidoanthraquinone in 110 parts of nitrobenzene is heated gradually to 140° C. with stirring. The mixture is stirred at 140° C. to 155° C. until the reaction is substantially complete. The solid product is removed by filtration, washed and dried, giving 6.6 parts of product which dyes cotton a brick red shade from a red-violet vat.

EXAMPLE 17

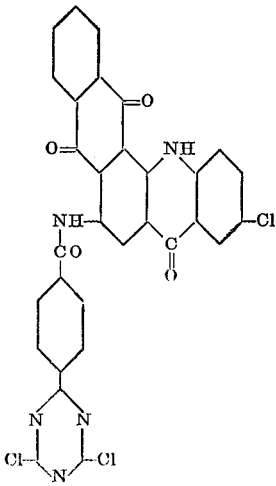

and

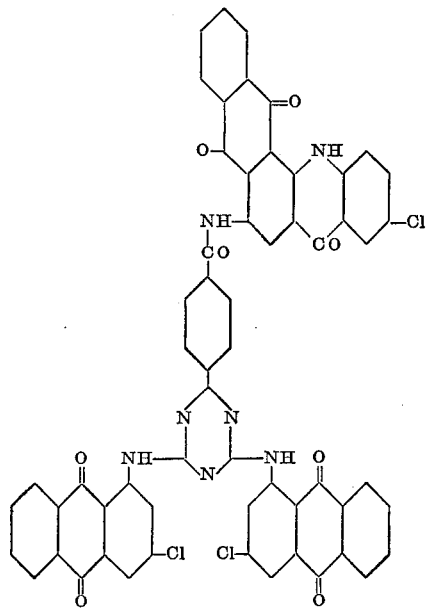

A slurry of 3.8 parts of 2-amino-7-chloro-3,4-phthaloyl acridone in 110 parts of nitrobenzene is heated at 195–200° C. until the acridone has dissolved. It is then cooled to 40° C. and 2 parts of the acid chloride of 2-(p-carboxyphenyl)-4,6-dichloro-s-triazine dye can be isolated by cooling, filtering and washing. It dyes cotton a blue-gray shade from a violet vat.

To the mixture containing the dichlorotriazine dye is added 5.1 parts of 1-amino-3-chloro-anthraquinone and 2.2 parts of chlorobenzene. The mixture is heated at 170–175° C. until the reaction is substantially complete. It is then cooled. At 40° C. the solid product is removed by filtration, washed and dried. The product dyes cotton a green color from a violet brown vat.

EXAMPLE 18

The procedure of Example 17 is followed using an equivalent amount of 1-aminoanthraquinone in place of the 1-amino-3-chloroanthraquinone. The heating in the second step need only be to 150° C. The product dyes cotton an olive green shade.

EXAMPLE 19

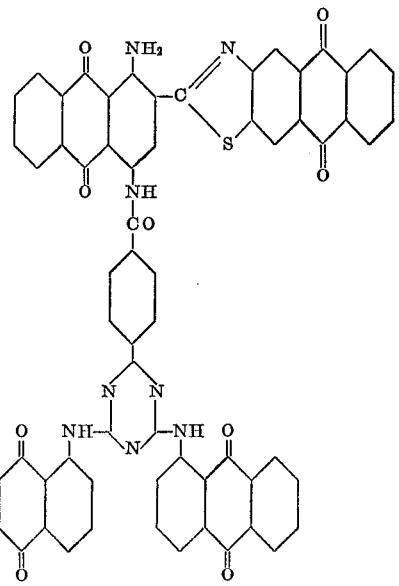

To 100 parts of molten phenol is added 5.1 parts of 2-(1,4 - diamino - 2 - anthraquinonyl)-anthra-(2,3-d)-thiazole-5,10-dione. The mixture is heated to the boiling point to remove water and is then cooled to 75° C., at which temperature 2.9 parts of the acid chloride of 2-(4-carboxyphenyl)-4,6-dichloro-s-triazine is added. The mixture is slowly warmed to 100–105° C. and is then stirred at this temperature until the reaction is substantially complete. To it is then added 4.5 parts of 1-aminoanthraquinone and the mixture is then stirred at 135–150° C. until the second reaction is substantially complete. The solid is removed by filtration and slurried in dilute sodium carbonate solution at about 80° C. The solid is removed by filtration, washed and dried. The product dyes cotton green shades from a brown-violet vat.

EXAMPLE 20

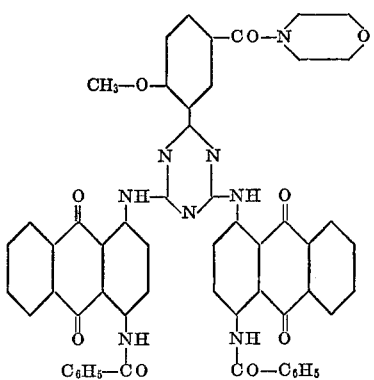

A mixture of 3.2 parts of the acid chloride of 2-(2-methoxy-5-carboxyphenyl)-4,6-dichlorotriazine and 1.75 parts of morpholine in 65 parts of o-dichlorobenzene is warmed to 65–75° C. until the reaction is substantially complete. A small residue is removed by filtration and to the filtrate is added 6.8 parts of 1-amino-4-benzamidoanthraquinone and an additional 55 parts of o-dichlorobenzene. The mixture is heated with stirring at 130–135° C. until the reaction is substantially complete. The solid product is removed by filtration, washed and dried. The product dyes cotton a red color.

EXAMPLE 21

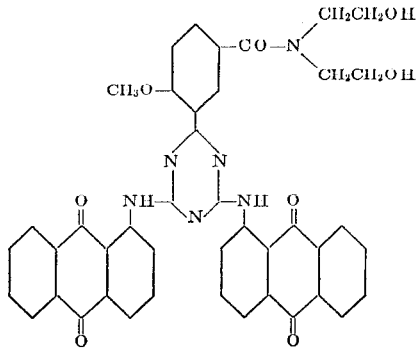

A slurry of 3.2 parts of the acid chloride of 2-(2-methoxy-5-carboxyphenyl) - 4,6 - dichlortriazine and 2.1 parts of diethanolamine in 75 parts of acetone is heated at 50–55° C. until the reaction is substantially complete. A slight residue is removed by filtration and 4.5 parts of 1-aminoanthraquinone and 85 parts of o-dichlorobenzene are added. Acetone is removed by distillation to a temperature of about 138° C. and the mixtures then stirred at 130–140° C. until the reaction is substantially complete.

The solid material is removed by filtration, washed well and dried. The product dyes cotton a reddish yellow shade.

EXAMPLE 22

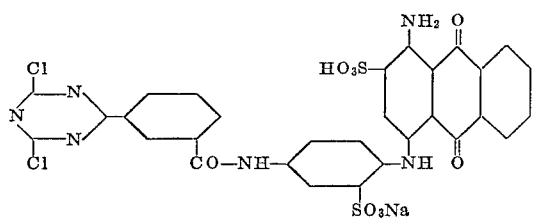

A solution of 5.4 parts of disodium salt of 1-amino-4-(4-aminoanilino)-anthraquinone-2,2'-disulfonic acid in 125 parts of water at 10° C. is aded gradually with good agitation to a solution of 2.9 parts of 2-(m-chlorocarbonylphenyl)-4,6-dichloro-s-triazine in 35 parts of acetone at 10° C. 8.4 parts of a 10% NaHCO₃ solution is then added to the mixture and the mass stirred at 5–10° C. until the reaction is substantially complete, while adding two parts more 10% NaHCO₃ to maintain faint alkalinity. To the dark blue slurry is then added 25 parts sodium chloride and after an hour, the solid is filtered at room temperature and the cake washed with a solution of 25 parts NaCl, 15 parts NaH₂PO₄·H₂O and 6 parts Na₂HPO₄ is 125 parts water. The wet cake is then dried at 20–45° C. The product dissolves in water with a greenish-blue color and in concentrated H₂SO₄ with a blue color. It dyes cotton a blue shade of excellent wash fastness when applied by the procedure of Example 24.

EXAMPLE 23

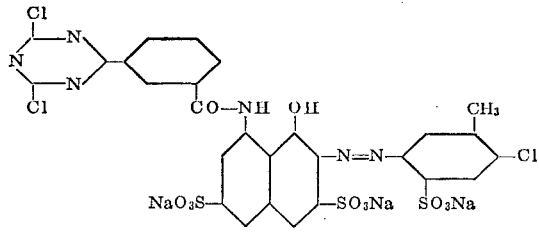

A 6.4 part portion of the trisodium salt of the aminoazo dye produced by diazotizing 4-chloro-5-methyl-aniline-2-sulfonic acid and coupling the diazo compound with an alkaline solution of H acid, is dissolved in 100 parts of water and the mixture is cooled to 5° C. The resulting solution is poured gradually with stirring into a solution of 2.9 parts of 2-(m-chlorocarbonylphenyl)-4,6-dichloro-s-triazine dissolved in 35 parts acetone and cooled to 5° C. 10 parts of a 10% NaHCO₃ solution is added and the mixture stirred while it is gradually warming to 10° C. Then 10 parts more 10% NaHCO₃ is added and the stirring is continued several hours at 20° C. The mixture is then warmed to 25° C. and 25 parts sodium sulfate is added. The mixture is stirring at room temperature to get homogeneity. The slurry is then filtered and the filter cake is washed with 20% Na₂SO₄ solution. The wet cake is dried at 20 to 45° C. the product dissolves in concentrated sulfuric acid with a bluish red color and in water with a red color. It dyes cotton bright bluish-red shades when applied by procedure of Example 24.

EXAMPLE 24

A dye solution is prepared by dissolving 2 grams of the dye of Example 23 in 100 grams of water containing 0.3 gram of surface active agent (polyoxyethylene esters of mixed fatty and resin acids). A piece of cotton fabric is padded in this solution at about 160–175° F. and is then removed and passed through rollers adjusted to allow an 80% pick up. The cloth is then dried.

The piece of dried fabric is then padded in 100 ml. of a chemical pad bath containing 30 grams of sodium chloride and 5 ml. of 30° Bé sodium hydroxide solution. It is removed and passed through rollers adjusted to allow about a 50% pick up. The temperature of this pad bath should be at about room temperature, about 20° C. The fabric is then steamed for a short time at 335° F.

Non-bonded dye is then removed from the fabric by soaping at the boil. This involves heating at the boiling point in a solution containing about 2 grams per liter of an oleate soap. The cotton fabric is dyed a bluish-red color of excellent wash fastness.

EXAMPLE 25

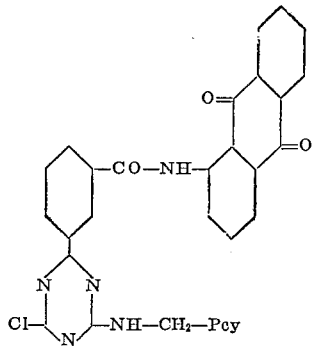

The procedure of the second paragraph of Example 16 is followed using ½ an equivalent of monoaminomethylphthalocyanine in place of 4-benzoylamino-1-aminoanthraquinone. The product is a green dye when dyed by the procedure of Example 24.

EXAMPLE 26

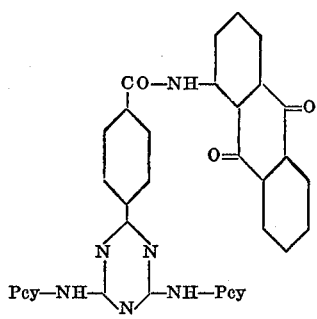

The procedure of Example 16 is followed using an equivalent amount of monoaminophthalocyanine for the benzoylamino 1-aminoanthraquinone. The product is a green blue pigment.

EXAMPLE 27

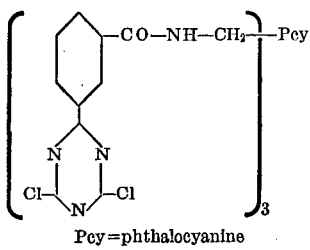

Pcy = phthalocyanine

The procedure of the first paragraph of Example 16 is followed using triaminomethylphthalocyanine in ⅓ the equivalent amount of the useage of aminoanthraquinone. The product is a dyed cotton blue by the procedure of Example 24.

EXAMPLE 28

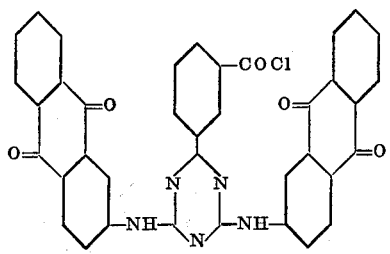

One equivalent weight of the product of Example 5 is dissolved in approximately 6 times its weight of monochlorobenzene. To this mixture is added one equivalent weight of water and the mixture is stirred at 60–70° C. until hydrolysis of the carboxy chlorine is complete. Slightly over two equivalent weights of 1-aminoanthraquinone is then added and the mixture is heated gradually to 140° C. It is stirred at 140–150° C. until the reaction is complete. The mixture is then cooled and an excess of a one equivalent of thionyl chlorine is then added. The mixture is then heated at 100–120° C. until the reaction is substantially complete. The product separates from the reaction mixture when it is cold. It is isolated by filtration and washing.

EXAMPLE 29

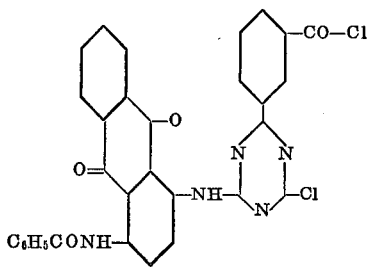

One equivalent weight of the product of Example 5 is added to approximately 6 times its weight of monochloro benzene. Approximately two equivalent weights of water is then added and the mixture is heated slowly to approximately 140° C. until hydrolysis of two of the chlorines is substantially complete. The chlorobenzene is then removed by vacuum distillation. The product is then used in the procedure of the second paragraph of Example 16 using this product in equivalent quantity in place of the dichloro product used there and half the quantity of 1-amino-4-benzamido anthraquinone. The product of this reaction is then used in the procedure of Example 5 using only ⅔ the equivalent quantity of phosphorus pentachloride. The dichloro compound is recovered by filtration from the chlorobenzene solution and is washed with alcohol and then dried.

EXAMPLE 30

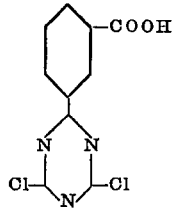

A one-mol quantity of the product of Example 5 is heated to 50–60° C. in 50 parts of chlorobenzene to which a one-mol quantity of water and a three mole quantity of pyridine has been added. On cooling, the carboxyphenyl dichlorotriazine separates.

This product, when used in the procedure of Example 6 with half the quantity of aminoanthraquinone, gives 2-(m-carboxyphenyl)-4-(1-anthraquinonylamino)-6-chloro-s-triazine, which on retreatment by the process of Example 5 gives the corresponding 2-(m-chlorocarbonylphenyl) triazine compound.

EXAMPLE 31

The procedures of the preceding examples are followed using the proper equivalent quantities of the appropriate carboxyphenyl triazine intermediate and the appropriate amino dyestuff to give the dyestuffs shown in the following table in which Ar, X, Y and Z refer to the general formula

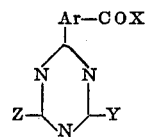

TABLE—See formula in Example 31

| Ar—CO— | X | Y | Z |
|---|---|---|---|
| (p-methylphenyl-CO—) | (NH/OH/NaO₃S-naphthyl-N=N-phenyl-SO₃Na) | Same as X | Same as X. |
| Same as above | Do. | Cl | Cl. |
| Same as above | Do. | Cl | Cl. |
| Same as above | Do. | Br | Br. |
| (p-methoxyphenyl-CO—) | (complex Cu azo stilbene structure with N-CH₃) | Cl | Cl. |
| Same as above | Same as above | (anthraquinone-NH—) | Same as Y. |
| (m-bromo-o-methylphenyl-CO—) | (bis-azo naphthol with Cl-phenyl) | Cl | Cl. |
| (methoxyphenyl-CO—) | (thioxanthone/anthraquinone NH— structure) | Cl | Cl. |

TABLE—Continued

| Ar—CO— | X | Y | Z |
|---|---|---|---|
| [cyclohexyl-CO—] | —NH—copper phthalocyanine sulfonic acid | [structure with NH, OH, N=N, SO₃Na, NaO₃S, CH₃, Cl] | Same as Y. |
| Same as above | Cl | Same as above | Cl. |
| Do | Cl | [anthraquinone structure with NH groups and Cl] | Cl. |
| Do | [structure with SO₃Na, N=N, OH, CO—NH-cyclohexyl, NH, SO₃Na] | Cl | Cl. |

What we claim is:
1. A dye having the formula
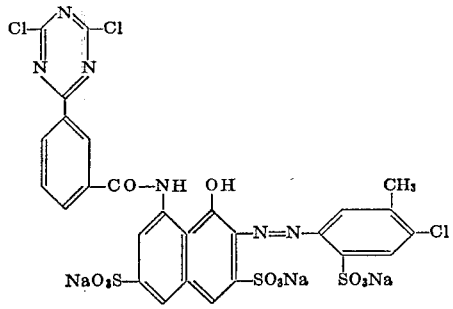
2. A dye having the formula
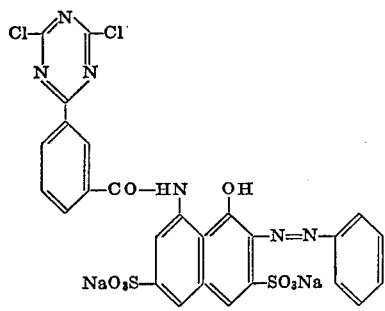
3. A dye having the formula
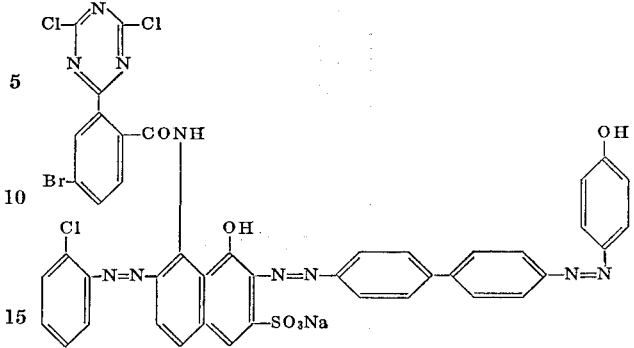
4. A dye having the formula
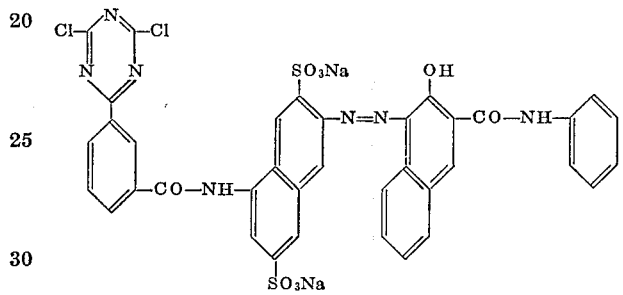
References Cited
UNITED STATES PATENTS
3,293,238   12/1966   Chang _____ 260—153
OTHER REFERENCES
Venkataraman, K., The Chemistry of Synthetic Dyes, Academic Press, N.Y., 1952, pp. 240–47.
FLOYD DALE HIGEL, Primary Examiner
U.S. Cl. X.R.
106—288 Q; 260—146 T, 153, 198, 242, 247.1, 247.2 A